Figure 9:
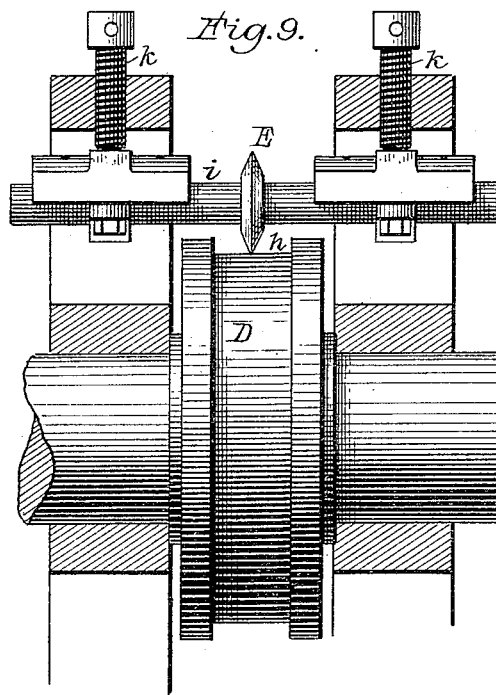

(No Model.)　　　　　　　　　　　　　　　　　　5 Sheets—Sheet 1.
C. H. PERKINS.
MANUFACTURE OF HORSESHOE BARS.
No. 449,051.　　　　　　　　　　Patented Mar. 24, 1891.
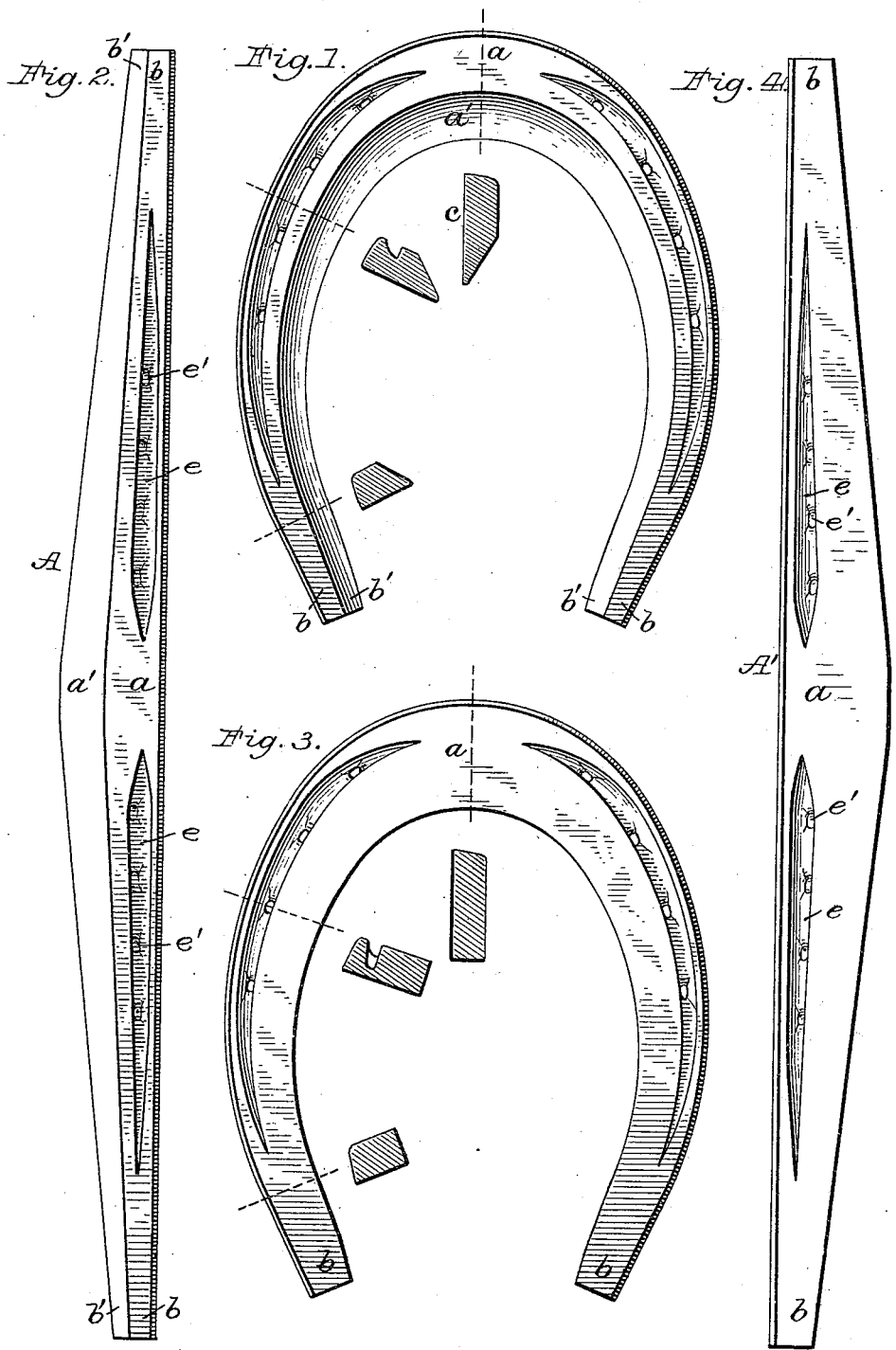

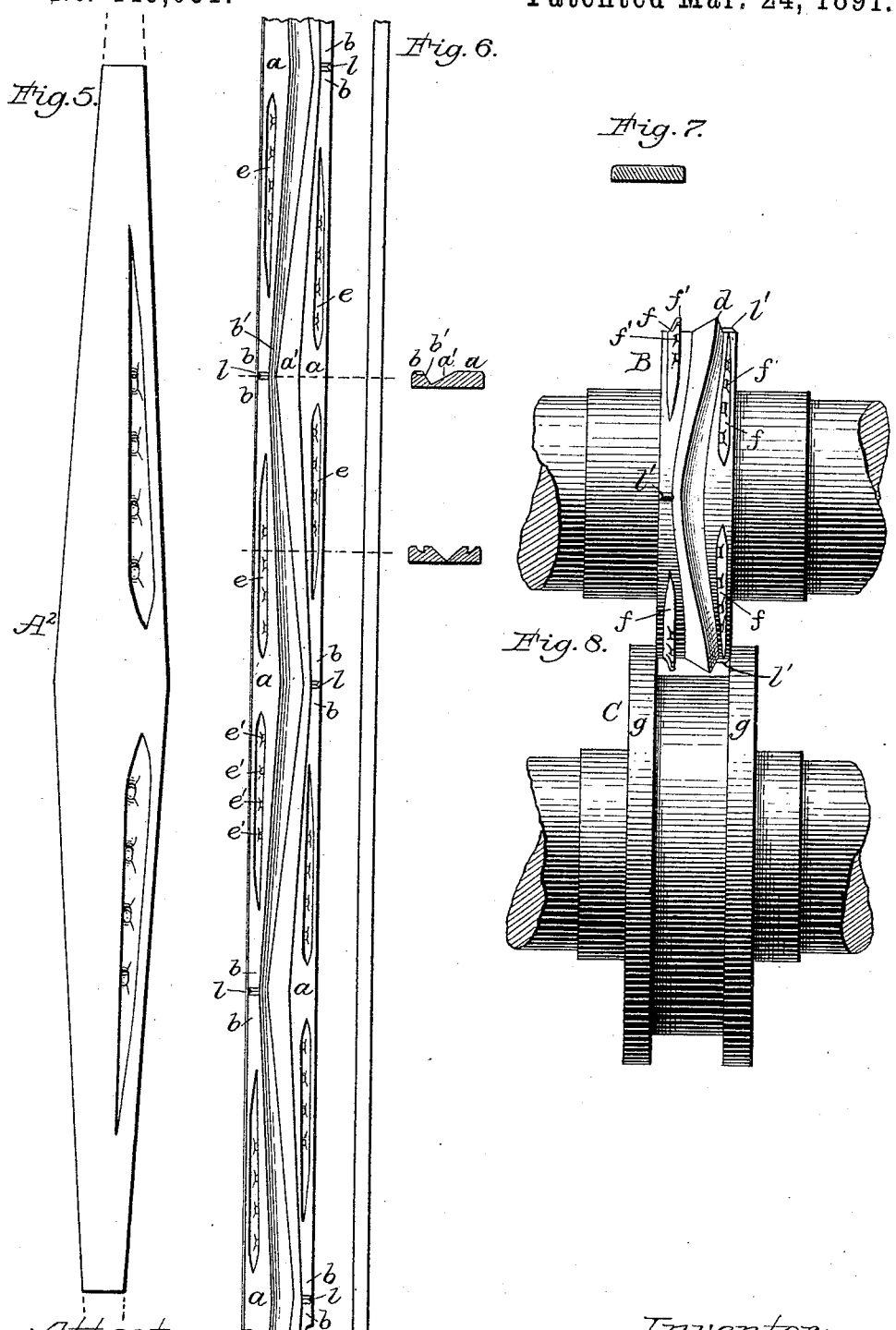

(No Model.) 5 Sheets—Sheet 3.

C. H. PERKINS.
MANUFACTURE OF HORSESHOE BARS.

No. 449,051. Patented Mar. 24, 1891.

Attest:
Philip F. Larner
Lowell Butts

Inventor:
Charles Henry Perkins.
By Wm. C. Wood
Attorney (No Model.) 5 Sheets—Sheet 4.
C. H. PERKINS.
MANUFACTURE OF HORSESHOE BARS.
No. 449,051. Patented Mar. 24, 1891.
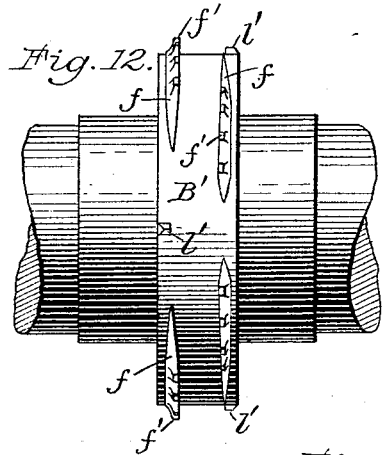
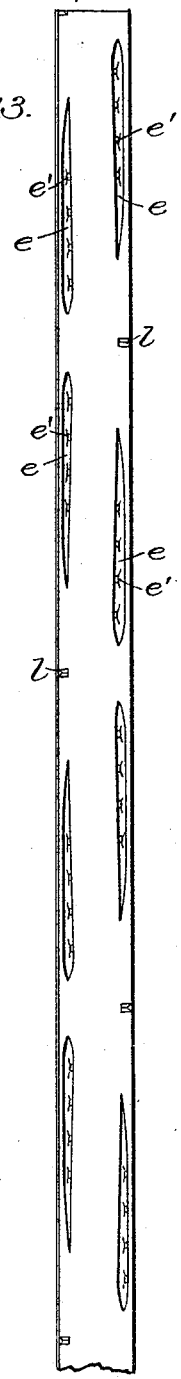
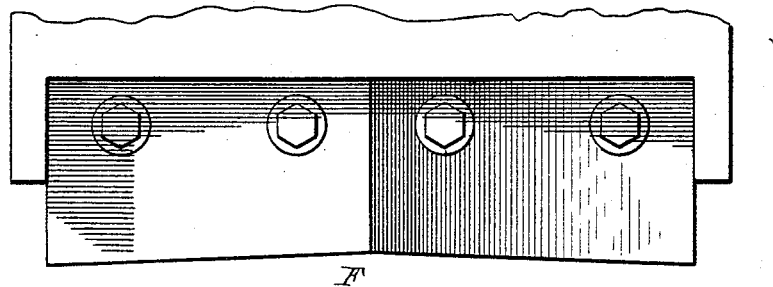
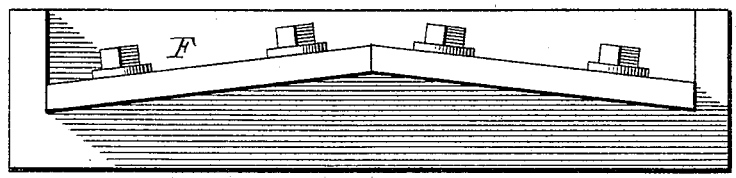
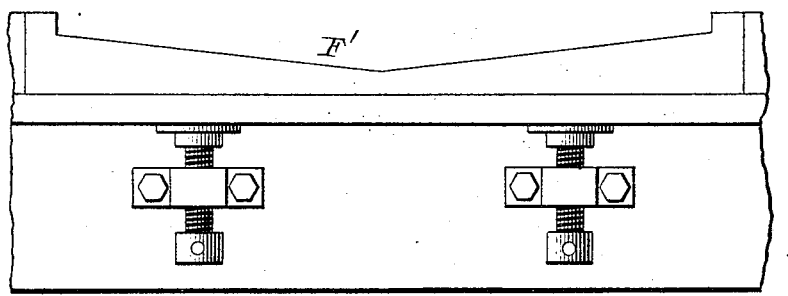
Attest:
Philip F. Larned.
Howell _____
Inventor:
Charles Henry Perkins
By _____
Attorney.

(No Model.) 5 Sheets—Sheet 5.
C. H. PERKINS.
MANUFACTURE OF HORSESHOE BARS.
No. 449,051. Patented Mar. 24, 1891.
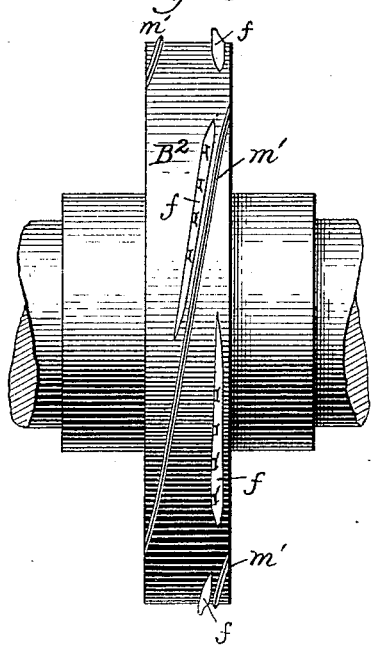
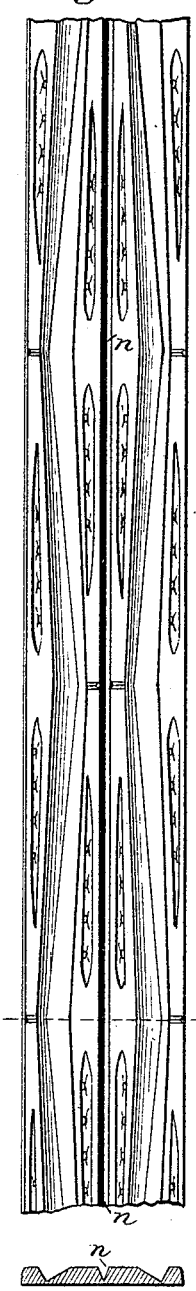
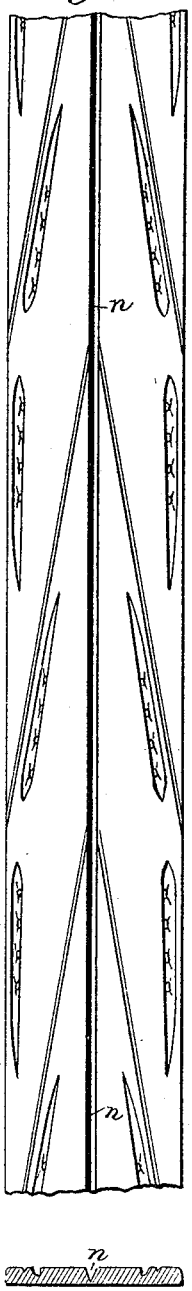
Attest:
Philip F. Larner
Howell Bartle
Inventor:
Charles Henry Perkins
By McC Ward
Attorney

United States Patent Office.

CHARLES HENRY PERKINS, OF PROVIDENCE, RHODE ISLAND, ASSIGNOR TO THE RHODE ISLAND HORSE SHOE COMPANY, OF SAME PLACE.

MANUFACTURE OF HORSESHOE-BARS.

SPECIFICATION forming part of Letters Patent No. 449,051, dated March 24, 1891.

Application filed August 14, 1890. Serial No. 361,963. (No model.)

*To all whom it may concern:*

Be it known that I, CHARLES HENRY PERKINS, of the city and county of Providence, in the State of Rhode Island, have invented certain new and useful Improvements in the Manufacture of Horseshoes; and I do hereby declare that the following specification is a clear, true, and complete description of the several features of my invention.

My said invention relates exclusively to the manufacture of blank-bars and blanks for making what are known as "toe-weighted" shoes, wherein the main proportion of the weight of the metal is located in the front or toe portion of the shoe. The special value of the toe-weighted shoe is widely recognized, and particularly so for use upon animals having prompt foot action, because of the fact that the shoe being mainly weighted at the front or toe of the hoof the latter in swinging forward on the ankle-joint as a pivot is caused to promptly recover its proper elevated position before next touching the ground, thus greatly obviating stumbling tendencies and securing desirable ease and freedom of movement. With a broad toe and the narrow heels the metal is as well distributed for durability as with ordinary shoes of similar tread area; but in the latter the narrowing of the heel-tread has been accompanied with increased thickness, so as, in fact, to render the shoe either of a balanced weight or with an excess of weight at the heels.

As a rule toe-weighted shoes have heretofore been made from suitable but comparatively short lengths of bar metal, which constitute blanks having a sectional area approximating more or less closely to the sectional area of the toe of the shoe, and the ends of these blanks have been elongated by forging operations, the heels of the shoes being narrowed without increasing their thickness. This mode of operation involves much expensive skilled labor with a minimum waste in metal. For lessening the labor I have heretofore rolled blanks of a length corresponding, substantially, with the curved line length of the shoes desired and provided the blanks with appropriate nail-scores; but the distribution of the metal was substantially uniform throughout the length of the blank, although varied more or less in its sectional contour, and then, either before or after the blank was bent, the metal at the inner portion of the shoe adjacent to the heels was clipped or sheared away for securing the desired excess of metal at the toe of the shoe.

I have now, as I believe, for the first time in the art of horseshoe-making, and by a novel method or process, produced a toe-weighted horseshoe-blank in which the metal is so accurately distributed that it is fitted for bending, and when it is bent into shoe form no labor or machining is required for varying any portion of its sectional contour, and when produced by my most approved methods and apparatus no waste of metal is involved except that which must inevitably occur at the stubs or ends of bars incident to unavoidable variations in their length.

Broadly stated, the main feature of my invention consists in rolling a straight-edged bar of metal, and then forming therein two sets or series of nail-scores offset or so located with reference to each other as to form a blank-bar which contains horseshoe-blanks side by side, but having opposite the toe portion of each blank the heel portions of two laterally-adjacent blanks.

My invention further consists in forming in a blank-bar appropriate nail-scores and then dividing the bar on lines diagonal or inclined to the longitudinal center of each blank. This parting of the blanks on said diagonal lines results in each instance in forming a receding edge from the toe portion of the blank toward its heel portion and secures in each blank a gradual diminution of metal from the toe to each heel. This main portion of my invention does not necessarily involve any variation from a substantially rectangular cross-sectional area in any portion of each blank or shoe, it being desirable that shoes for heavy service should present as broad a tread area as possible.

My invention, however, further consists in forming a blank-bar with appropriate nail-scores and with a zigzag groove which affords beveled edges at one side of each blank and then parting the blanks on lines diagonal or inclined to the longitudinal center of each blank, thus affording in each blank the varied distribution of bulk and weight of metal required in a toe-weighted shoe, and also any desired variation in sectional contour, so that a shoe may have on its inner side either a uniform bevel or when in its best form it will be flatly beveled at the toe and more steeply beveled at the heels.

It is well known that the forming of nail-creases of proper depth closely adjacent to the outer edges of a blank or shoe (other than by the use of hand tools) involves a liability of distortion when formed in blanks singly formed, and hence in the first step of my process the nail-creasing is performed prior to the separation of the blanks from each other, and in the development of blank-bars in accordance with certain portions of my invention the blanks are formed in two series side by side in each bar, and although each bar, broadly considered, is a "double blank-bar," it is radically unlike such prior double blank-bars as were devised by me and disclosed in my Letters Patent Nos. 174,924 and 192,127. In my said prior blank-bars, the blanks lie side by side, and they are divisible on central lines parallel with the longitudinal center of each blank, and the nail-scores, with their nail-head prints or recesses, are located in any one blank exactly opposite those of the adjacent parallel blank, and the bar, when cut into proper lengths, affords two blanks in each length. In a blank-bar involving my present invention the nail-score may be continuous near each edge of the bar without departure from my invention; but said score should be in proper lengths, and whether provided with nail-head prints or not such scores in any one blank should be alternated in their location and arrangement with reference to the scores in the laterally-adjacent blank, because in my blank-bars the toe portion of any one blank is alongside of or laterally opposite the heel portions of two adjacent blanks, and in one form of my bars these two heel portions are at one side of the toe portion of the laterally-adjacent blank and in another form the heel portions of two blanks are separated by the toe portion of the laterally-adjacent blank, and the division on either form of bar into blanks on the diagonal lines referred to secures a gradually-reversed taper from the middle of each blank toward its ends, although in the one case the diagonal parting-lines constitute a central zig-zag line and in the other case the diagonal parting-lines extend from one edge of the blank-bar to the other edge, thus affording the gradually-reversed taper in the blanks cut from both bars, although in one blank both tapers are formed on two cut lines and in the other blank one taper is on one cut line and the other taper is what was originally a portion of the straight edge of the bar.

In working my novel method or process the mechanical means employed may be widely varied without departure from my invention, it being practicable to form my blank-bars either by die-rolling operations or by die-presses, although with a view to the best economic results rolling operations will always be preferable. In the separation of the blanks various cutting or shearing tools may be employed, and in the separation of some of my blanks the die-rolls may be relied upon to so far perform the dividing operation that complete separation may be accomplished without the aid of cutting or splitting mechanism.

To more particularly describe my invention I will describe the working of my method or process in connection with the accompanying drawings, which illustrate different forms of mechanism employed by me, as well as the varied blank-bars and blanks produced, and also two varieties of toe-weighted horseshoes.

Figure 10:
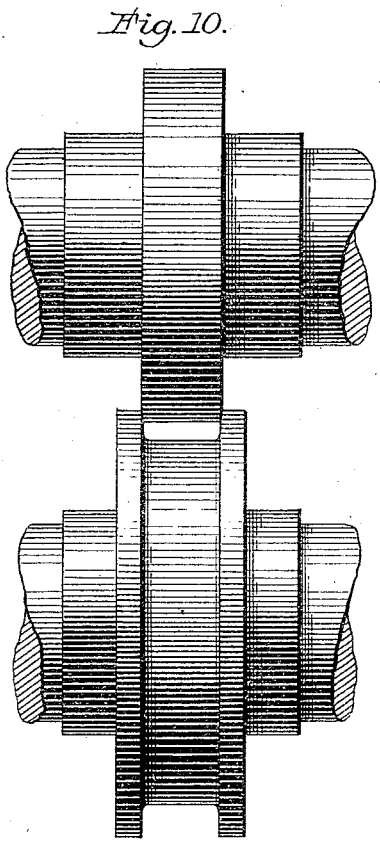
Figure 11:
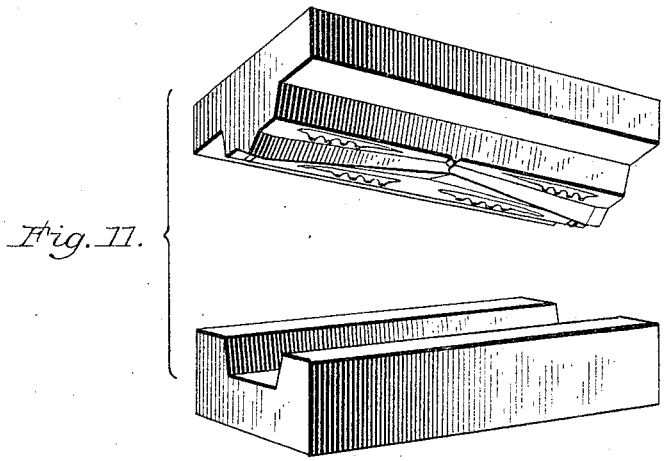

Referring to the drawings, Figure 1 illustrates a toe-weighted horseshoe in its most approved form with several sectional views clearly indicating the character of the varied bevel at the inner edge of the shoe. Fig. 2 illustrates that form of my blanks which is embodied in shoes of the kind shown in Fig. 1. Fig. 3 illustrates a plain toe-weighted shoe with several sectional views thereof. Figs. 4 and 5 illustrate two forms of my blanks for use in making shoes like that shown in Fig. 3. Fig. 6 illustrates in plan view, side view, and several sections a blank-bar embodying blanks like that shown in Fig. 2. Fig. 7 in cross-section illustrates the form of the bar from which the blank-bar, Fig. 6, is developed. Fig. 8 in front view illustrates the working portions of a pair of rolls devised by me for producing the blank-bar, Fig. 6. Fig. 9 in front view illustrates the operating parts of a splitting-machine devised by me for separating the blanks on their diagonal or angular lines. Fig. 10 in front view illustrates a pair of rolls for forming the straight metal bars, and these may be also used for specially finishing the blank-bar, Fig. 6, and fitting the blanks for use in the manufacture of specially-finished or fancy shoes. Fig. 11 illustrates a pair of dies, the bed-die having a working contour corresponding to a portion of the contour of the die-roll of Fig. 8. Fig. 12 illustrates a die-roll for the production of a blank-bar, Fig. 13, which embodies blanks like that of Fig. 4. Fig. 14 in front and bottom edge views and in plan view illustrates the working parts of a cutting-press for diagonally separating the blanks of the bar, Fig. 13. Fig. 15 in front view illustrates a die-roll for the production of a blank-bar like that in Fig. 16, which embodies blanks like that of Fig. 5. Fig. 17 illustrates a blank-bar embodying four lines of blanks, or, in other words, two such blank bars as are shown in Fig. 6. Fig. 18 illustrates a blank bar embodying two such blank bars as are shown in Fig. 16.

In comparing "toe-weighted" shoes with ordinary shoes it should be noted that the latter have heels thicker than the toes. The toe wears faster than the heels, and the latter being thicker than they need be the toe-weighted shoe is more durable than an ordinary shoe of the same size, weight, and tread area, and its broad toe can readily receive a toe-calk.

I will first describe my novel method or process in connection with the production of the best forms of shoe, as illustrated in Fig. 1, the single blank, Fig. 2, and the blank-bar, Fig. 6.

Commencing with the shoe, Fig. 1, it will be seen that it is substantially uniform in thickness, although the wide toe $a$ has a broad inner bevel $a'$, and the narrow heels $b$ have a narrow bevel $b'$, and that the top $c$ of the shoe is substantially flat, although sometimes slightly inclined inwardly from the outer edge. These several parts of the shoe are correspondingly designated in the blank A, Fig. 2, it being understood that the blank is of the same length as the shoe on its central curved line, and consequently blanks are prepared for each size of shoe.

Now, referring to the blank-bar, Fig. 6, it will be seen that it is a double blank-bar; but it is unlike any other, in that it has opposite the toe portion $a$ of each blank A the two heel portions $b$ of two parallel blanks, and that the blanks of the two parallel series are almost separated by a zigzag groove, which varies in its form in accordance with the coincident variations between the broad bevels $a'$ and the narrow bevels $b'$. It will also be seen that at the bottom of the zigzag groove there is a well-defined parting-line on which the blanks are to be separated and that each straight portion of said line is diagonal or inclined to the longitudinal center of each of the adjacent blanks.

For forming this blank-bar with a view to the best economic results I employ rolls, as illustrated in Fig. 8. The two rolls B and C are geared together, and I prefer that the working-face of the bed-roll C should be a trifle greater in diameter than the greatest diameter of the die-roll B. This die-roll is controlled in the usual way by screws at each end, and it is provided with a zigzag tongue $d$, which is circular in its outline, but varies in its form or sectional area in exact conformity with the zigzag groove in the blank-bar, thus securing the diagonal parting-lines as well as the varied bevel, between the toe and the heel portions of each blank.

Again, referring to the double blank-bar of Fig. 6, it is to be understood that it further differs from any prior double blank-bar known to me in that the nail-scores $e$ in the blanks at the one side of the parting-line are not, as heretofore, exactly opposite the scores in the blanks of the other side; but said scores are now for the first time offset with reference to each other in any two closely-adjacent or opposite blanks, so that each score will be appropriately located in each blank nearer the toe portion than the heels. While forming these nail-scores (other than by hand) it is of great practical advantage that the blanks be integrally connected laterally with other blanks for preventing undue distortion during the operation of the creasing-tools, and especially if the scores contain the usual deep recesses or head-prints $e'$ for well housing nail-heads, as well as for facilitating the usual punching operations.

In the forming of the preferred bar, Fig. 6, with the variably-beveled zigzag groove the developing of the nail-scores $e$ and also the head-prints $e'$ can be performed either simultaneously with the shaping of the blanks or subsequently; but in the simultaneous operation the most perfect and most economic results will accrue. I therefore provide the die-roll B with scoring creasers or tongues $f$ and head-print spurs $f'$, these being appropriately disposed to secure the offset arrangement before referred to.

The bed-roll C is grooved or (which serves the same purpose) is provided with collars $g$, which can be made adjustable. Front and back guides are usually employed with these rolls; but they are of a common form and require no illustration. After the bar has been formed by these rolls the two lines of blanks are separated on the diagonal parting-lines by any suitable cutting or slitting mechanism, although the edge of the zigzag tongue of the die-roll, being quite sharp and well defined, may be so far advanced toward the face of the bed-roll as to leave the metal so thin and weak that it may be easily broken apart, the rough edges being readily smoothed or rounded by a properly-formed center die in a bending-machine or by a lightly-operating milling-tool. The parting of the blanks in this form of bar can, however, be most satisfactorily performed by means of a slitting-machine devised by me for that purpose, as illustrated in Fig. 9. This machine embodies a driven bed-roll D, having a groove $h$ or a pair of collars. On top of this roll a rotary slitting-tool E is mounted on a shaft $i$ and is free to revolve with its edge in contact with the face of the groove in the driven roll, and said shaft is free to slide in its boxes longitudinally. The boxes at the ends of said shaft have a broad bearing on top of the shaft provided with mere supporting-stirrups below, and on each box a screw $k$ is arranged to bear for securing close-sliding contact between the edge of the tool E and the underlying sufrace of the bed-roll. The diameter of the tool E is so small that it can freely follow the diagonal lines when a blank-bar is inserted endwise between it and the bed-roll, the shaft $i$ sliding to and fro in conformity with each change of direction, the groove in the bed-roll confining the bar to a right-line movement.

The separation of the blanks at their heels is performed in the usual way by shearing, and, as in prior double blanks, the shearing-points are well defined by the scores $l$; but, unlike those in any prior double blank, these scores alternate in position or are offset with relation to those next adjacent at the opposite edge of the bar, and for forming these scores the die-roll B is provided with appropriately-arranged wedge-shaped spurs $l'$.

In the manner and by the means thus far particularly described my novel method or process can be most successfully practiced for the production of blanks required for toe-weighted shoes of the highest grade, and I will now describe the production of blanks suitable for toe-weighted shoes of the variety shown in Fig. 3, and especially the blank $A'$ shown in Fig. 4. This blank is formed in the blank-bar Fig. 13, and this blank-bar differs from the bar Fig. 6 in having no zigzag groove; but it has the same arrangement of nail-scores $e$, head-prints $e'$, and heel-scores $l$, the latter in this bar serving not only to indicate shearing-points for the blanks in one line, but also as gage-points during the cutting operation in separating the blanks on the diagonal lines. The die-roll $B'$, Fig. 12, for producing the blank-bar Fig. 13, differs from the previously-described roll B only in that it has no zigzag tongue; but this roll has the same nail-score creasers $f$, head-print spurs $f'$, and heel-spurs $l'$.

Although this blank-bar is to be divided on a zigzag line, it is not material that any parting-line should be indicated by the roll. The latter may, however, have a mere marking score or tongue; but it will be of little service, because the indentations or recesses $l$ between the heel portions of the blanks afford reliable gage-points for properly locating the bar with reference to an angular cutter F, Fig. 14. This cutter has a shearing-edge, which conforms to the shearing-edge of a reversely-angular bed $F'$, the latter at one side having a vertical guide, with which one edge of the blank-bar is kept in contact while being moved step by step longitudinally after each operation by the cutter, thus separating the several blanks at the outer side of the bar and leaving the others connected in one line to be separated by means of ordinary shears.

Both of the blanks thus far particularly described have one edge reversely diagonal or inclined from the toe toward the ends, and these diagonal edges are developed by shearing or cutting tools; but in the blank $A^2$, Fig. 5, one half of the reversely-diagonal edge is developed by shearing, and the other half is a part of the original side line or edge of the blank-bar. If a blank of this variety has one edge afterward beveled, it will of course be necessarily bent in one direction; but if the blank be plain, as shown, and without nail-scores, it may be bent in either direction for forming a shoe. This blank is formed in a double blank-bar, Fig. 16, preferably by means of a die-roll, as shown in Fig. 15. This die-roll $B^2$ differs from either of the others previously described in that its nail-score creasers $f$ are alternately arranged, so that only one-half of them are in line with each other, and therefore they locate one nail-score in each blank closely adjacent to and parallel with one edge of the blank-bar. The remainder of the nail-creasers alternate with the others and are diagonal thereto and parallel with the diagonal lines on which the blanks are to be separated, and these lines $m$ are indicated in the blank-bar by means of diagonal marking-tongues $m'$ on the die-roll. A blank-bar thus formed is readily separated into blanks by means of ordinary shears cutting on the lines $m$, an angularly-arranged guide serving to properly present the bar to the shears. In forming this blank the ends are of course in a pointed form, and as these must be clipped off some little waste of metal is involved, although but little metal need be removed if the shoes be for winter use, because the narrower ends can be readily converted into such sharpened or roughened heels as are needed on solid snow and ice.

It will be seen that in each of the blank-bars shown the nail-creases are in two series and that each crease in either series is offset with relation to the laterally-adjacent crease, or, in other words, in each bar the nail-creases are so located as to be nearer the toe portion of each blank than the heel portion; and this offset arrangement is imperative, because in each of the blank-bars there are two heel portions of two blanks opposite the toe portion of the laterally-adjacent blank.

It will be understood that in the manufacture of my blanks and blank-bars the most economic results will accrue by working the metal from billets into ordinary bar form, as indicated in Fig. 7, and then, while the metal is still in good heat, passing it through the die-rolls, thus completing the blank-bars without further heating of the metal. Considering facility in handling the metal while rolling, I prefer that my blank-bars be so rolled that in each bar the blanks will lie substantially side by side and with the heel ends of two blanks opposite the toe or central portion of a laterally-adjacent blank; but the blank-bars may be duplicated, or even triplicated, in any one complex bar without in any manner departing from my invention—as, for instance, as illustrated in Figs. 17 and 18. In these instances my double blank-bars are duplicated, but are separable on a straight-line parting-groove $n$, which can be obviously formed deeply enough to enable a ready separation and with but little fin at the parted line, and especially if the die-roll and the bed-roll be each provided with tongues to co-operate in a manner well known.

While the best economic results will obviously accrue by the use of die-rolls, in the practice of my method or process I do not restrict myself thereto, because I am well aware that practically desirable results will accrue from the use of dies and compressing mechanism for forming the nail-creases and locating them with reference to each other as described, with a view to the separation of the blanks on diagonal lines.

In Fig. 11 I have illustrated a pair of dies for forming the blank-bar Fig. 6, a drop-press or toggle-press of suitable power being required for forming one complete blank and one-half of two others, the metal bar being advanced after each compression. This operation would involve light jets of flaming furnace-gas or other means for keeping the dies from overcooling, and the blank-bars could not be conveniently worked in such desirable lengths or with the same economy as to heat as with rolling; but, notwithstanding all this and an incident waste in metal, substantial economy would be involved when compared with the production of toe-weighted shoes by methods heretofore practiced. With such dies, provided only with the nail-creasers of the die-rolls $B^2$ and $B^3$ of Figs. 12 and 15, the forming of the blank-bars Figs. 13 and 16 can be readily accomplished by compressing operations.

While my present application is restricted to the novel method or process described for producing these blanks, it is to be understood that said blank-bars in their several forms are novel and will be made the subjects of separate applications for Letters Patent. (See Serial Nos. 366,218, 366,534, 366,723, and 366,862.) It is also to be understood that all of said blanks, considered separately from blank-bars, are valuable novelties in the art of horseshoe-making, inasmuch as each of them is of uniform thickness, but has a wide toe portion and is tapered gradually to the ends or heel portions, and hence said blanks will be made the subjects of appropriate claims in the aforesaid separate applications for patent. The slitting-machine, Fig. 9, and also the die-rolls herein shown are believed to be novel tools in this art, and they also will be made the subjects of separate applications for Letters Patent.

Having thus described my invention, I claim as new and desire to secure by Letters Patent—

1. The method or process of manufacturing blank-bars containing blanks for toe-weighted horseshoes, which consists in rolling a straight bar of metal and then forming therein two series of nail-scores, which in one series are offset with relation to laterally-adjacent scores, substantially as described, whereby the bar may be divided on lines diagonal or inclined to the longitudinal center of each blank.

2. The method or process of manufacturing blanks for toe-weighted horseshoes by forming in a bar of metal nail-scores appropriate for each blank and then dividing said bar on lines diagonal or inclined with reference to the longitudinal center of each blank, substantially as described.

3. The method or process of manufacturing blanks for toe-weighted horseshoes, which consists in forming in a bar of metal nail-scores appropriate to each blank and a longitudinal zigzag groove variably beveled at its sides and then dividing said bar on the zigzag line at the center or bottom of said groove.

4. The method or process of manufacturing blanks for toe-weighted horseshoes, which consists in forming in a metal bar nail-creases which are offset with relation to the next laterally-adjacent nail-creases for locating the heel portions of each two of the blanks laterally opposite the toe portion of an adjacent blank and then dividing the bar on lines which are diagonal or inclined to the longitudinal center of each blank.

CHARLES HENRY PERKINS.

Witnesses:
CHARLES R. STARK,
JOHN L. WILCOX.